(12) United States Patent
Emrich et al.

(10) Patent No.: US 12,107,281 B2
(45) Date of Patent: Oct. 1, 2024

(54) METHOD FOR PRODUCING A COVER ASSEMBLY FOR A CELL HOUSING OF A PRISMATIC BATTERY CELL HAVING A SEALING ELEMENT, AND BATTERY CELL

(71) Applicant: Bayerische Motoren Werke Aktiengesellschaft, Munich (DE)

(72) Inventors: Niclas Emrich, Munich (DE); Seokyoon Yoo, Baldham (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 664 days.

(21) Appl. No.: 17/421,920

(22) PCT Filed: Mar. 9, 2020

(86) PCT No.: PCT/EP2020/056169
§ 371 (c)(1),
(2) Date: Jul. 9, 2021

(87) PCT Pub. No.: WO2020/207679
PCT Pub. Date: Oct. 15, 2020

(65) Prior Publication Data
US 2022/0029226 A1 Jan. 27, 2022

(30) Foreign Application Priority Data
Apr. 11, 2019 (DE) ............... 10 2019 109 541.7

(51) Int. Cl.
*H01M 50/15* (2021.01)
*H01M 50/176* (2021.01)
(Continued)

(52) U.S. Cl.
CPC ......... *H01M 50/15* (2021.01); *H01M 50/176* (2021.01); *H01M 50/188* (2021.01);
(Continued)

(58) Field of Classification Search
CPC .. H01M 50/15; H01M 50/176; H01M 50/564; H01M 50/553; H01M 50/188;
(Continued)

(56) References Cited

U.S. PATENT DOCUMENTS 5,593,797 A * 1/1997 Brecht .................... H01M 4/14
429/185
2013/0177803 A1* 7/2013 Kugino ............... H01M 50/191
429/179
2017/0117575 A1 4/2017 DeWulf et al.

FOREIGN PATENT DOCUMENTS

| CH | 389 698 A | 3/1965 |
|---|---|---|
| CN | 103125032 A | 5/2013 |

(Continued)

OTHER PUBLICATIONS

Chinese-language Office Action issued in Chinese Application No. 202080008099.3 dated Nov. 1, 2022 with English translation (16 pages).

(Continued)

*Primary Examiner* — Jane J Rhee
(74) *Attorney, Agent, or Firm* — Crowell & Moring LLP

(57) ABSTRACT

A method produces a cover assembly for a cell housing of a prismatic battery cell. In the method, a cell terminal consisting of three portions is arranged on a cover plate in such a way that one portion is arranged in a through-opening of the cover plate, another portion and the cover plate overlap to form a first interspace, and a further portion and the cover plate overlap to form a second interspace. A sealing element is provided in one of the interspaces and is preloaded by compressing the interspace. The cell terminal is connected to the cover plate by introducing a plastic into the interspace without the sealing element.

10 Claims, 3 Drawing Sheets

(51) Int. Cl.
*H01M 50/188* (2021.01)
*H01M 50/553* (2021.01)
*H01M 50/557* (2021.01)
*H01M 50/562* (2021.01)
*H01M 50/564* (2021.01)

(52) U.S. Cl.
CPC ....... *H01M 50/553* (2021.01); *H01M 50/557* (2021.01); *H01M 50/562* (2021.01); *H01M 50/564* (2021.01); *H01M 2220/20* (2013.01)

(58) Field of Classification Search
CPC ............. H01M 50/562; H01M 50/557; H01M 2220/20
See application file for complete search history.

(56) References Cited

FOREIGN PATENT DOCUMENTS

| | | |
|---|---|---|
| DE | 1 848 642 U | 3/1962 |
| DE | 1 801 675 A | 5/1969 |
| DE | 38 22 078 A1 | 1/1990 |
| DE | 10 2014 106 204 A1 | 11/2015 |
| EP | 2 620 993 A1 | 7/2013 |
| FR | 2 798 227 A1 | 3/2001 |
| FR | 3 019 686 A1 | 10/2015 |
| JP | 8-203494 A | 8/1996 |
| JP | 2015-88372 A | 5/2015 |

OTHER PUBLICATIONS

International Search Report (PCT/ISA/210) issued in PCT Application No. PCT/EP2020/056169 dated Jun. 19, 2020 with English translation (four (4) pages).

German-language Written Opinion (PCT/ISA/237) issued in PCT Application No. PCT/EP2020/056169 dated Jun. 19, 2020 (five (5) pages).

German-language Search Report issued in German Application No. 10 2019 109 541.7 dated Feb. 6, 2020 with an English translation (11 pages).

* cited by examiner

METHOD FOR PRODUCING A COVER ASSEMBLY FOR A CELL HOUSING OF A PRISMATIC BATTERY CELL HAVING A SEALING ELEMENT, AND BATTERY CELL

BACKGROUND AND SUMMARY OF THE INVENTION

The invention relates to a method for producing a cover assembly for a cell housing of a prismatic battery cell. The invention moreover relates to a battery cell.

The focus is presently directed toward high-voltage batteries, or high-voltage accumulators, in particular for motor vehicles that can be electrically driven. Such high-voltage batteries have a multiplicity of battery cells which are typically disposed in a united cell structure and are wired so as to form a battery module. The battery cells can be prismatic battery cells which have a cell housing of a flat cuboid shape, a galvanic element being disposed in the housing interior of the cell housing. Electrodes of the galvanic element are electrically connected to cell terminals of the battery cell, the cell terminals being guided through a cover plate of the cell housing and the galvanic element by way of the cell terminals being able to be electrically connected to a cell-external connector, for example a cell terminal of another battery cell. To this end, it is known from the prior art to overmold at least one of the cell terminals with an electrically insulating plastics material so as to fasten the cell terminal to the cover plate, on the one hand, and to electrically isolate the metallic cell housing in relation to the cell terminal, on the other hand.

Moreover, the housing interior is to be tight in relation to a housing exterior so as to prevent any exchange of substances between the housing interior and the housing exterior. For example, it is to be prevented that electrolyte exits the housing interior and moisture enters the housing interior, cell ageing of the battery cells being accelerated as a result thereof.

It is an object of the present invention to improve a cell housing of a prismatic battery cell for a high-voltage battery with a view to the cell housing being configured so as to be particularly tight.

This object is achieved according to the invention by a method and by a battery cell having the features according to the respective independent patent claims. Advantageous embodiments of the invention are the subject matter of the dependent patent claims, of the description and of the figures.

A method according to the invention serves for producing a cover assembly for a cell housing of a prismatic battery cell. Provided in the method are at least one multi-part cell terminal having a plate-shaped first contact portion for electrically connecting to a cell-external connector, a second contact portion for electrically connecting to a galvanic element of the battery cell, and a connecting portion which mechanically and electrically connects the first contact portion and the second contact portion. Moreover provided is a cover plate which for covering the cell housing has at least one through opening. The cell terminal is disposed on the cover plate in such a manner that the connecting portion is disposed in the through opening, the first contact portion and an upper side of the cover plate overlap while configuring a first intermediate space, and the second contact portion and a lower side of the cover plate overlap while configuring a second intermediate space. Moreover, provided is a sealing element in one of the intermediate spaces, the sealing element being prestressed by compressing the intermediate space in which the sealing element is disposed. In order for the cell terminal to be connected to the cover plate and hold the sealing element in the prestressed state, a plastics material is incorporated into the other intermediate space.

The invention furthermore includes a prismatic battery cell for a high-voltage battery, having a cover assembly which has a galvanic element and a cell housing and is produced by a method according to the invention. The cover assembly is in particular welded to a housing casing of the cell housing, and the second contact portion is electrically connected to an electrode of the galvanic element. The prismatic battery cells according to the invention can be wired so as to form a high-voltage battery, for example. The high-voltage battery is in particular configured as a traction battery for a motor vehicle which can be electrically driven, for example an electric or hybrid vehicle.

The cover assembly and a housing lower part, the latter being formed from a housing casing and a base plate, form the cell housing for the prismatic battery cell. The cover plate, the housing casing, and the base plate here enclose a housing interior for the galvanic element of the battery cell. The cover plate and the base plate are in particular configured as rectangular plate-shaped elements such that a cell housing of a flat cuboid shape is formed. The cell housing here is in particular formed from a metallic material, for example aluminum. The cover plate has in particular two through openings for two cell terminals. The cell terminals are thus guided through the cover plate. A first cell terminal can be electrically connected to a first electrode, for example an anode, of the galvanic element, and a second cell terminal can be electrically connected to a second electrode, for example a cathode, of the galvanic element.

At least one of the cell terminals here is configured in multiple parts, in particular two parts, and has the three portions in the form of the two contact portions and the connecting portion. The connecting portion is preferably configured so as to be integral to one of the contact portions. The first contact portion is configured so as to be plate-shaped and in the assembled state of the cell housing is disposed on an external side of the cell housing. The first contact portion here extends so as to be substantially parallel to the upper side of the cover plate and is disposed so as to be spaced apart from the upper side of the cover plate while in an overlapping region configuring the first, upper intermediate space. The connecting portion and the second contact portion in the assembled state of the cell housing are disposed in the housing interior, wherein the connecting portion is fastened to a lower side of the first contact portion. In the disposed state, the connecting portion on the first contact portion, proceeding from the first contact portion, extends obliquely, for example perpendicularly, to the first contact portion. The second contact portion, proceeding from the connecting portion, extends so as to be substantially parallel to the first contact portion. In the state of the cell terminal disposed on the cover plate, the second contact portion thus extends so as to be substantially parallel to the lower side of the cover plate and is disposed so as to be spaced apart from the lower side of the cover plate while in an overlapping region configuring the second, lower intermediate space.

The sealing element is disposed in one of the intermediate spaces. The point in time at which the sealing element is disposed in the intermediate space may be variable here. For example, the sealing element can already be disposed on the cell terminal and be disposed in the intermediate space by introducing the connecting portion into the through opening. It can also be provided that the sealing element is disposed in the intermediate space only upon guiding the connecting portion through the through opening, or upon disposing the cell terminal on the cover plate. The sequence of the method steps is thus not mandatory but at least to some extent optional. The sealing element can be configured as an annular seal, for example, or be injected into the intermediate space. A material and a geometry, in particular a cross section, of the sealing element here can be arbitrary.

This elastic sealing element which is disposed in the intermediate space between one of the contact portions and the cover plate is now prestressed in that the intermediate space is compressed. To this end, the cover plate and the contact portion which delimits this intermediate space can be compressed. The sealing element is compressed as a result. For example, the sealing element can completely fill the associated intermediate space and, when compressed, can partially slide into a gap between a periphery of the through opening and the connecting portion. The gap which would represent a leakage in the cell housing can thus be sealed or closed off. In order to hold the sealing element in the prestressed state in which the sealing element closes off the associated intermediate space and, for example, also the through opening, the plastics material, for example in an injection-molding process, is incorporated at least in the intermediate space in which no sealing element is disposed. Should the sealing element not slide into the gap between the periphery of the through opening and the connecting portion and not completely fill the associated intermediate space, for example, the plastics material can flow through the gap between the periphery of the through opening and the connecting portion into the intermediate space with the sealing element.

The plastics material mechanically connects, in particular in a material integral manner, at least the contact portion adjacent to this intermediate space to the cover plate, and thus holds the cover plate and the cell terminal in a mutual position which is predefined by compressing the intermediate space with the sealing element. For example, an injection molding tool in which the cover plate, the cell terminal and the sealing element are disposed can be provided whereby, for prestressing the sealing element, the cover plate and one of the contact portions are compressed by means of the injection-molding tool. The plastics material is then injected into the intermediate space without the sealing element, and the cover assembly remains in the injection molding tool until the plastics material has cured and holds the sealing element in the prestressed state.

The plastics material injected into the intermediate space here can be a thermoplastic material, an elastomer, or a thermo-setting plastics material. Preferably, a plastics material in the form of a thermo-setting plastics material is injection-molded into the intermediate space. Thermo-setting plastics materials are plastics material which upon curing can no longer be deformed by heating or other measures. Moreover, thermo-setting plastics materials are particularly cost-effective and have a good resistance to temperature.

For example, one of the cell terminals, for example the anode-proximal cell terminal, can be overmolded with an electrically insulating plastics material, while the other cell terminal, for example the cathode-proximal cell terminal, is overmolded with an electrically conductive plastics material. As a result, the anode-proximal cell terminal is electrically isolated from the cell housing, while the cathode-proximal cell terminal lies on the electrical potential of the cell housing. It may also be the case that both cell terminals are overmolded with the electrically insulating plastics material.

In order for the adhesion between the plastics material and the cell terminal as well as between the plastics material and the cover plate to be improved, those surface regions of the cell terminal and of the cover plate that face the intermediate space to be filled with the plastics material can be provided with a surface structure which has structured elements, for example. The structured elements have in particular dimensions in the nanometer or micrometer range and can be configured as pores, capillaries, incisions, protrusions and/or undercuts, for example. The structured elements can be produced by means of a laser, for example. When the plastics material is being injected into the intermediate space, the plastics material which at this point of time is still liquid flows across the structured elements and when solidifying or curing additionally connects to the structured elements in a form-fitting manner. Further joining means, such as an adhesive or the like, can in particular be dispensed with as a result of structuring the respective surface regions of the cell terminal and of the cover plate, because the plastics material and the respective surface regions configure a particularly stable and effective connection across the entire area.

A particularly tight connection between the cover plate and the cell terminal can be established with a few method steps by incorporating the sealing element in the process of fastening the cell terminal to the cover plate. A particularly tight connection is to be understood to be in particular a connection which is tight at least in terms of the leakage of helium. A particularly durable high-voltage battery can thus be provided in particular for the use in a motor vehicle that can be electrically driven.

In one refinement of the invention, one of the contact portions is provided as a separate contact part. The connecting portion is connected to another of the contact portions and has a free unconnected end. The connecting portion is guided through the through opening, and the free end of the connecting portion guided through the through opening is electrically and mechanically connected to the separate contact part. The contact part is fastened to the connecting portion in particular by laser welding. This embodiment is based on the concept that dimensions of the contact portions are larger than a diameter of the through opening, while a dimension, in particular a diameter, of the connecting portion is smaller than the diameter of the through opening. The connecting portion can thus simply be pushed through the through opening. To this end, the connecting portion is connected to a contact portion only at one side. To this end, the connecting portion can be configured so as to be integral to one of the contact portions, for example.

When the connecting portion is connected to the second contact portion, for example, the connecting portion can thus be pushed through the through opening from below. The second contact portion here is disposed so as to overlap with the lower side of the cover plate while configuring the second intermediate space. The first contact portion, which is present as the separate contact part, can then be disposed so as to overlap the upper side of the cover plate while configuring the first intermediate space, and be connected to the connecting portion. For example, when the connecting portion is connected to the first contact portion, the connecting portion can be pushed through the through opening from above. The first contact portion here is disposed so as to overlap with the upper side of the cover plate while configuring the first intermediate space. The second contact portion, which is present as the separate contact part, can then be disposed so as to overlap the lower side of the cover plate while configuring the second intermediate space, and be connected to the connecting portion.

In a first variant, the sealing element is disposed about the connecting portion. The connecting portion is then guided through the through opening. The sealing element herein is jammed between the contact portion, which is connected to the connecting portion, and the cover plate. The contact part is finally connected to the free end of the connecting portion. In this first variant, the sealing element can be configured as a closed annular seal, for example, which is pushed over the free end of the connecting portion and pulled onto the connecting portion. The connecting portion which is equipped with the sealing element is then pushed through the through opening, wherein the intermediate space between the cover plate and the contact portion, which is connected to the connecting portion, is formed as a result. The sealing element is simultaneously disposed in this intermediate space. When the connecting portion, which is connected to the second contact portion, is pushed through the through opening from below, for example, the sealing element is thus disposed in the second intermediate space. The first contact portion, which is configured as a separate contact part, is then connected to the connecting portion, and the plastics material, upon prestressing the sealing element, is incorporated in the first intermediate space. For example, when the connecting portion, which is connected to the first contact portion, is pushed through the through opening from above, the sealing element is thus disposed in the first intermediate space. The second contact portion, which is configured as a separate contact part, is then connected to the connecting portion, and the plastics material, upon prestressing the sealing element, is incorporated in the second intermediate space.

In a second variant, the connecting portion is guided through the through opening, and the sealing element is disposed about the free end of the connecting portion, which has been guided through the through opening. The sealing element herein is disposed on the cover plate. The contact part is finally fastened to the free end of the connecting portion while configuring the intermediate space for the sealing element. For example, when the connecting portion, which is connected to the second contact portion, is pushed through the through opening from below and the free end of the connecting portion projects on the upper side of the cover plate, the sealing element is thus disposed on the upper side of the cover plate in such a manner that the sealing element surrounds the free end. For example, the sealing element may be the annular seal which is pushed over the free end. The first contact portion, which is configured as a separate contact part, is then connected to the connecting portion while configuring the first intermediate space. The plastics material is incorporated in the second intermediate space upon prestressing the sealing element. For example, when the connecting portion, which is connected to the first contact portion, is pushed through the through opening from above and the free end of the connecting portion projects on the lower side of the cover plate, the sealing element is thus disposed on the lower side of the cover plate in such a manner that the sealing element surrounds the free end. The second contact portion, which is configured as a separate contact part, is then connected to the connecting portion while configuring the second intermediate space. The plastics material is incorporated in the first intermediate space upon prestressing the sealing element.

In another variant, the cell terminal is first completely disposed on the cover plate and the sealing element is then placed into one of the intermediate spaces. The sealing element here can be an annular seal with a slot, for example. It is particularly advantageous for the sealing element to be injected and thus to be configured as an injection-molded part. Upon prestressing the sealing element, the plastics material is in turn injected into the intermediate space without the sealing element.

In one refinement of the invention, the connecting portion and the second contact portion are integrally configured by deep-drawing a metal sheet, for example a copper sheet, wherein the connecting portion is configured by deep-drawing a pot-shaped profile, and the second contact portion is configured as a collar region which projects from legs of the pot-shaped profile. As a result of the pot-shaped profile, the connecting portion has a bearing region for bearing on the first contact portion, and two legs which project from the bearing region. The legs here can be configured for example so as to project perpendicularly from the bearing region while configuring a rectangular pot-shaped profile, or so as to project obliquely from the bearing region while configuring a trapezoidal pot-shaped profile. The collar region, which is oriented so as to be parallel to the bearing region, is configured so as to project from the legs of the pot-shaped profile. The sealing element here can be pushed over the connecting portion, for example, and placed onto the second contact portion. Such a profile can be formed in a particularly simple manner by deep drawing a metal sheet by means of a die.

It can also be provided that the cell terminal is configured having an I-beam profile, and to this end the first contact portion and the second contact portion are configured so as to be plate-shaped and the connecting portion is configured so as to be web-shaped. The web-shaped or column-like connecting portion can be cuboid or cylindrical, for example. The web-shaped connecting portion can already be connected to one of the plate-shaped contact portions when the connecting portion is being guided through the through opening.

It can be provided that the first contact portion is produced by cladding two plates, wherein a first plate, to be connected to the first connecting portion, is formed from a first metal from which the connecting portion is also formed, and a second plate, to be connected to the cell-external connector, is formed from a second metal which is dissimilar to the first metal. For example, the first plate can be formed from copper and the second plate formed from aluminum. The two plates can be connected so as to form the plate-shaped first contact portion by cladding, in particular roller-cladding.

The embodiments presented in the context of the method according to the invention, and the advantages of these embodiments, apply in analogous manner to the battery cell according to the invention.

Further features of the invention are derived from the claims, the figures and the description of the figures. The features and combinations of features mentioned above in the description and the features and combinations of features mentioned hereunder in the description of the figures and/or shown individually in the figures may be used not only in the respectively specified combination but also in other combinations or by themselves.

The invention will now be explained in more detail by means of a preferred exemplary embodiment and with reference to the drawings.

Identical and functionally equivalent elements are provided with the same reference signs in the figures.

DETAILED DESCRIPTION OF THE DRAWINGS

Figure 1A:
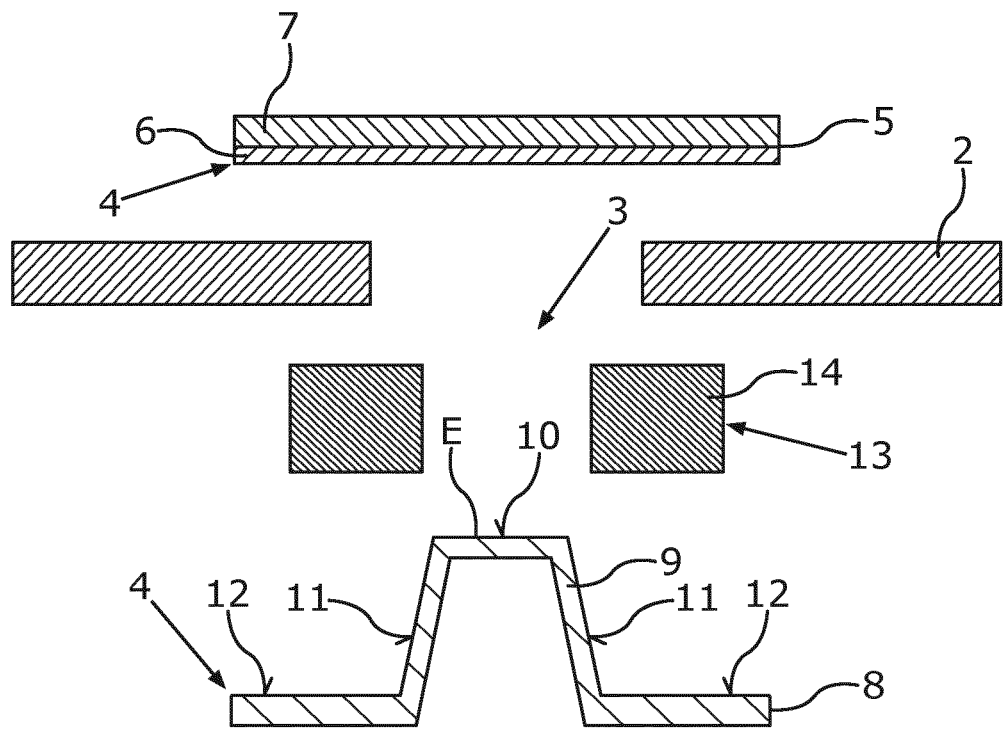
FIGS. 1a to 1e show method steps for producing a first embodiment of a cover assembly for a battery cell.
Figure 1B:
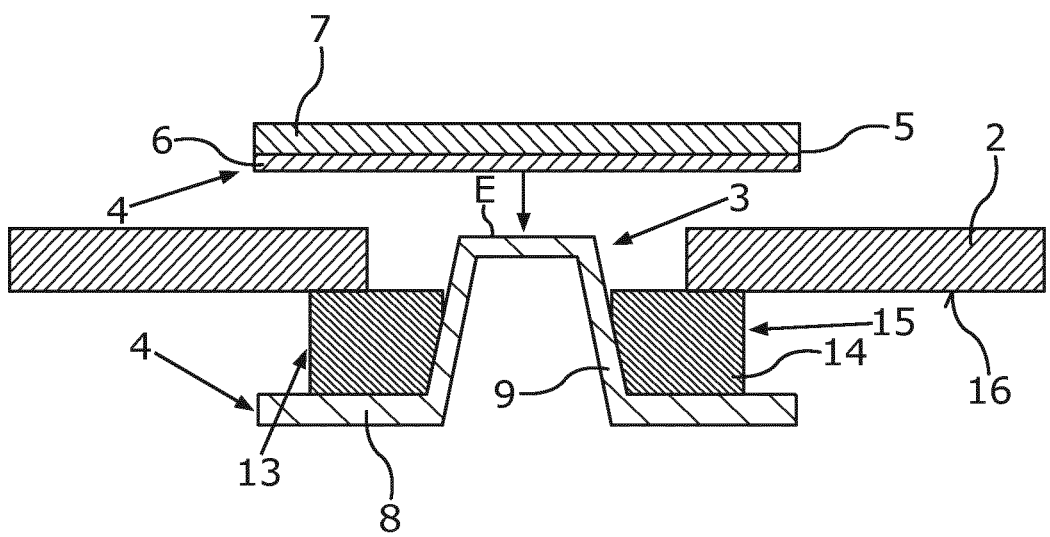
Figure 1C:
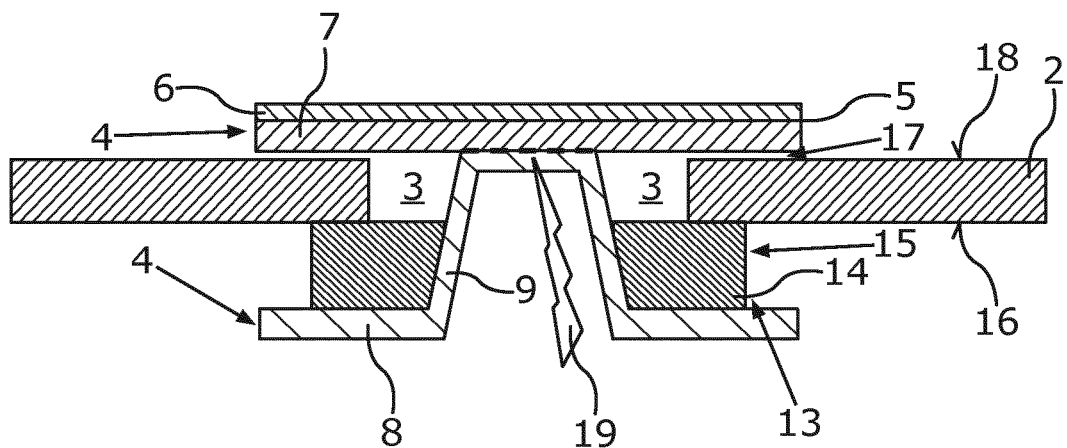
Figure 1D:
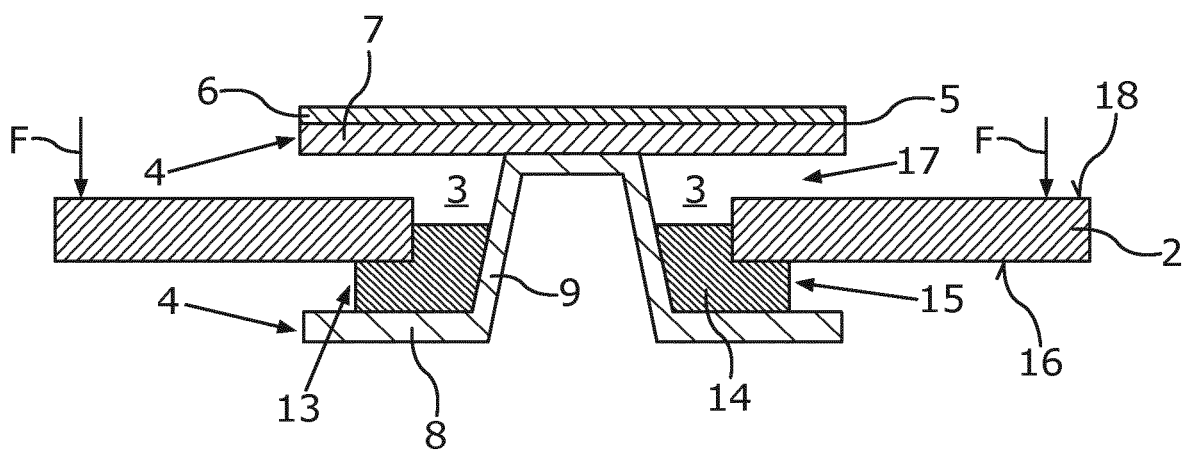
Figure 1E:
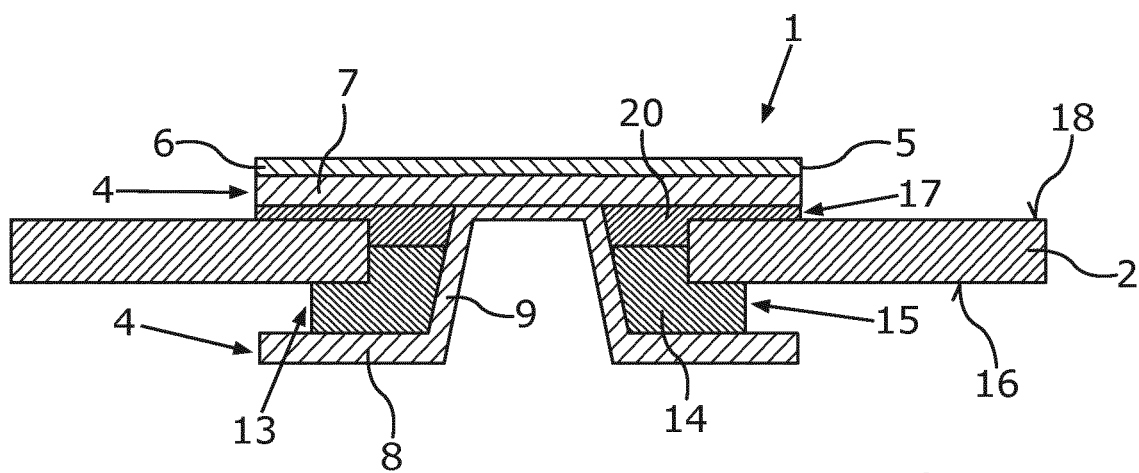

FIG. 1a to FIG. 1e show method steps for producing a first embodiment of a cover assembly 1 as is shown in the assembled state in FIG. 1e. The cover assembly 1 may be part of a cell housing (not shown here) of a prismatic battery cell which can be used, for example, in a traction battery of a motor vehicle that can be electrically driven. Components of the cover assembly 1 in the non-assembled state of the cover assembly 1 are shown in FIG. 1a. The cover assembly 1 has a cover plate 2 having a through opening 3. The cover plate 2 serves for covering the cell housing of the prismatic battery cell, wherein a galvanic element of the battery cell in the form of an electrolyte-impregnated electrode separator assembly is disposed in the cell housing. Moreover, the cover assembly 1 has a cell terminal 4 which is configured in two parts. The cell terminal 4 has a plate-shaped first contact portion 5 which here is cladded, for example roller-cladded. The first contact portion 5 has a first plate 6 from a first metal, for example copper, and a second plate 7 which covers the first plate 6 and is from a second metal, for example aluminum.

Moreover, the cell terminal 4 has a second contact portion 8 which can be indirectly or directly connected to an electrode of the galvanic element, and a connecting portion 9 which is connected to the first contact portion 5 and the second contact portion 8. The second contact portion 8 and the connecting portion 9 here are integrally configured. The connecting portion 9 here has a pot-shaped, in particular trapezoidal or conical, profile and thus has a bearing region 10 for bearing on the first contact portion 5, and two legs 11 which extend obliquely away from the bearing region 10. A collar region 12 which projects from the legs 11 forms the second contact portion 9 which extends so as to be parallel to the first contact portion 5. Such an integral configuration of the conical connecting portion 9 and of the second contact portion 8 can be formed by deep drawing a metal sheet by means of a die, for example.

Moreover, the cover assembly 1 has a sealing element 13 which here is configured as an elastic, closed annular seal 14. The annular seal 14 is pushed over the connecting portion 9 in the direction of the arrow and thus surrounds the first connecting portion 9, as is shown in FIG. 1b, and bears on the second contact portion 8. The connecting portion 9 is then pushed through the through opening 3 from below, and thus disposed in the through opening 3. A lower intermediate space 15 in which the annular seal 14 is situated is created here between a lower side 16 of the cover plate 2 and the second contact portion 8. The lower side 16 of the cover plate 2 faces the housing interior of the cell housing.

The first contact portion 5, which here is present as a separate contact part, is then placed onto a free end E on the connecting portion 9 and disposed so as to overlap an upper side 18 of the cover plate 2 while configuring an upper intermediate space 17 (see FIG. 1c). The first contact portion 5 is then fastened to the connecting portion 9 by laser welding 19. The sealing element 13 is subsequently prestressed in that the cover plate 2 and the second contact portion 8 are compressed. As a result, the lower intermediate space 15 and the sealing element 13 are compressed. For compressing, a force F can be applied to the cover plate 2, as is shown in FIG. 1d, and the latter as a result be pushed in the direction of the second contact portion 8 which is held so as to be stationary. The sealing element 13, which completely fills the lower intermediate space 15 here, in the prestressed state here in regions pushes into the through opening 3.

In order for the sealing element 13 to be held in the prestressed state, the cell terminal 4 is fastened to the cover plate 2, as is shown in FIG. 1d. To this end, a liquid plastics material 20 is injected into the presently upper intermediate space 17 between the cover plate 2 and the first contact portion 5, the sealing element 13 not being situated in the upper intermediate space 17. Upon curing of the plastics material 20, the latter holds the sealing element 13 in the prestressed state. The sealing element 13 and the plastics material 20 seal the through opening 3 so that the liquid electrolyte in the assembled state of the battery cell cannot exit the cell housing or dirt particles and water cannot enter the cell housing.

Figure 2:
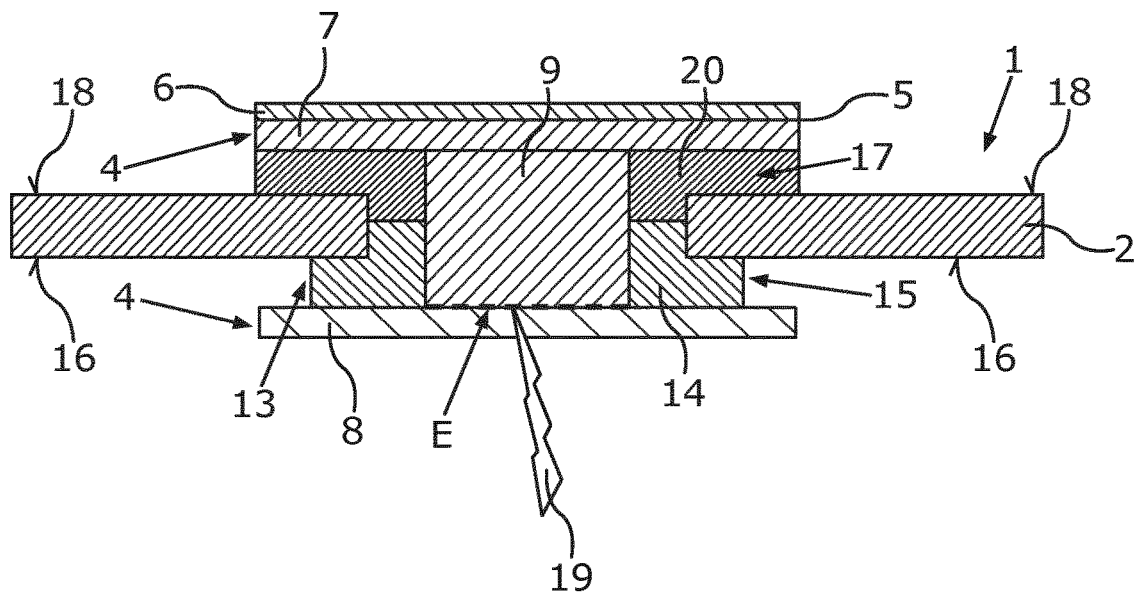
FIG. 2 shows a second embodiment of a cover assembly for a battery cell.

A second embodiment of the cover assembly 1 is shown in FIG. 2. The first contact portion 5 and the connecting portion 9 here are connected. The second contact portion 8 is configured as the separate contact part. To this end, the connecting portion 9 is configured so as to be integral to the second plate 7 of the roller-cladded first contact portion 5. The connecting portion 9 here is pushed through the through opening 3 from above. The free end E of the connecting portion 9 projects on the lower side 16 of the cover plate 2. The annular seal 14 is then pushed over the free end E of the connecting portion 9 and thus disposed on the lower side 16 of the cover plate 2. The second, here plate-shaped, contact portion 8 is then disposed on the connecting portion 9 while configuring the lower intermediate space 15, and fastened by means of laser welding, for example. The cell terminal 4 here has an I-beam-shaped cross section. Upon prestressing the sealing element 13 by compressing the lower intermediate space 15, the plastics material 20 is finally injected into the upper intermediate space 17.

Figure 3:
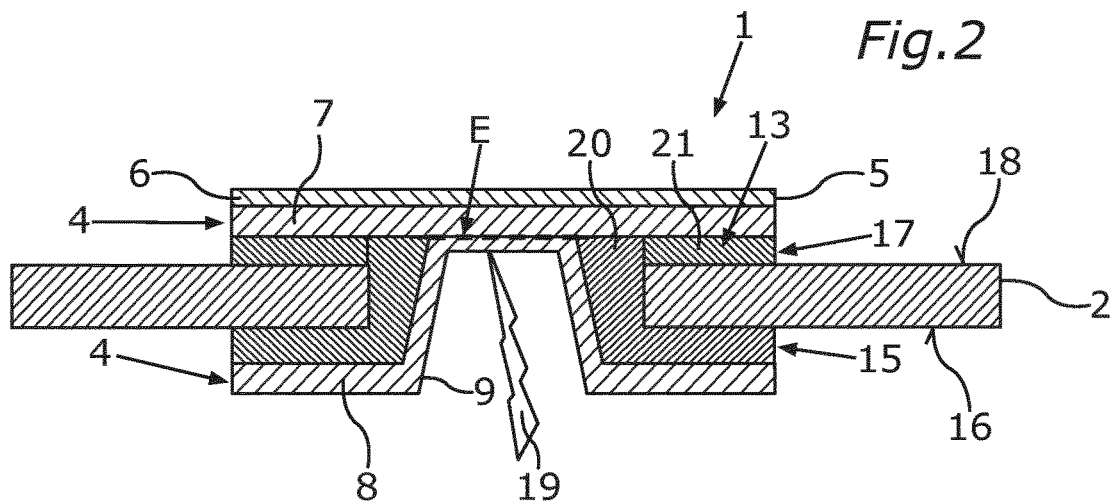
FIG. 3 shows a third embodiment of a cover assembly for a battery cell.

A third embodiment of the cover assembly 1 is shown in FIG. 3. The shape of the cell terminal 4 here corresponds to the shape of the cell terminal 4 according to FIG. 1a to FIG. 1e. For example, first the connecting portion 9 having the trapezoidal profile here is pushed through the through opening 3 from below. The free end E of the connecting portion 9 projects on the upper side 18 of the cover plate 2 and is connected to the first contact portion 5 which here is present as a separate contact part. The sealing element 13 here is then incorporated in the upper intermediate space 17. The sealing element 13 here is configured as an injection-molded element 21, for example. The sealing element 13 here does not completely fill the associated intermediate space 17. The injection-molded element 21 is prestressed, and the plastics material 20 is injected into the lower intermediate space 15, the plastics material 20 being distributed in the lower intermediate space 15 and flowing through the through opening 3 into the upper intermediate space 17.

Figure 4:
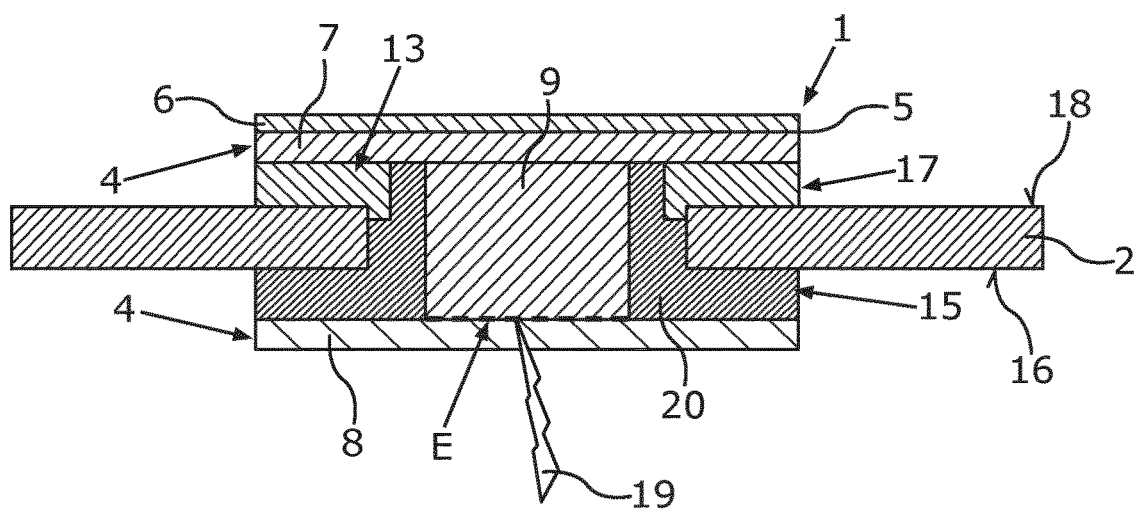
FIG. 4 shows a fourth embodiment of a cover assembly for a battery cell.

A fourth embodiment of the cover assembly 1 is shown in FIG. 4. The shape of the cell terminal 4 here corresponds to the shape of the cell terminal 4 according to FIG. 2. The sealing element 13 can be configured as an annular seal 14 which, prior to the connecting portion 9 being guided through the through opening 3, is pushed over the connecting portion 9 and upon being guided through the through opening 3 is disposed between the upper side 18 of the cover plate 2 and the first contact portion 5. The second contact portion 8, which here is present as a separate contact part, is then fastened to the free end E which projects on the lower side 16 of the cover plate 2. The first contact portion 5 can then be pressed in the direction of the cover plate 2, as a result of which the annular seal 14 is prestressed. As a result, the annular seal 14 is in regions disposed in the through opening 3. The plastics material 20 is then incorporated in the lower intermediate space 15 and here in regions flows through the through opening 3 into the upper intermediate space 17 where said plastics material 20 cures and holds the annular seal 14 in the prestressed state. Alternatively thereto, the cell terminal 4 can first be completely disposed on the cover plate 2, the sealing element 13 then be placed therein, for example injected, and the plastics material 20 finally be injected.

What is claimed is:

1. A method for producing a cover assembly for a cell housing of a prismatic battery cell, the method comprising the steps of:
   a) providing at least one multi-part cell terminal having a solid plate-shaped first contact portion for electrically connecting to a cell-external connector, a second contact portion for electrically connecting to a galvanic element of the battery cell, and a connecting portion which mechanically and electrically connects the first contact portion and the second contact portion;
   b) providing a cover plate for covering the cell housing, the cover plate having at least one through opening;
   c) disposing the cell terminal on the cover plate such that the connecting portion is disposed in the through opening, the first contact portion and an upper side of the cover plate overlap while configuring a first intermediate space, the first contact portion being wider than the through opening, and the second contact portion and a lower side of the cover plate overlap while configuring a second intermediate space;
   d) providing a sealing element in one of the first and second intermediate spaces;
   e) prestressing the sealing element by compressing the one intermediate space in which the sealing element is disposed; and
   f) connecting the cell terminal to the cover plate and holding the sealing element in the prestressed state by incorporating a plastics material into the other intermediate space.

2. The method according to claim 1, wherein the sealing element is configured as an annular seal or is injected into the intermediate space.

3. The method according to claim 1, wherein for carrying out step c), one of the contact portions is provided as a separate contact part, and the connecting portion is connected to another of the contact portions and has a free unconnected end, wherein the connecting portion is guided through the through opening, and the free end of the connecting portion guided through the through opening is electrically and mechanically connected to the separate contact part.

4. The method according to claim 3, wherein steps c) and d) are carried out in that the sealing element is disposed about the connecting portion, the connecting portion is guided through the through opening, and the sealing element herein is jammed between the contact portion, which is connected to the connecting portion, and the cover plate, and the contact part is connected to the free end of the connecting portion.

5. The method according to claim 3, wherein steps c) and d) are carried out in that the connecting portion is guided through the through opening, the sealing element is disposed about the free end of the connecting portion, which has been guided through the through opening, and herein is disposed on the cover plate, and the contact part is fastened to the free end of the connecting portion while configuring the intermediate space for the sealing element.

6. The method according to claim 3, wherein first step c) is carried out, and then step d) is carried out, wherein the sealing element, upon connecting the contact part to the free end of the connecting portion, is placed into one of the intermediate spaces.

7. The method according to claim 1, wherein the connecting portion and the second contact portion are integrally configured by deep-drawing a metal sheet, the connecting portion is configured by deep-drawing a pot-shaped profile, and the second contact portion is configured as a collar region which projects from legs of the conical profile.

8. The method according to claim 1, wherein the cell terminal is configured having an I-beam profile, with the first contact portion and the second contact portion being configured so as to be plate-shaped and the connecting portion being configured so as to be web-shaped.

9. The method according to claim 1, wherein the first contact portion is produced by cladding two plates, wherein a first plate, to be connected to the connecting portion, is formed from a first metal from which the connecting portion is also formed, and a second plate, to be connected to the cell-external connector, is formed from a second metal which is dissimilar to the first metal.

10. A prismatic battery cell for a high-voltage battery, comprising:
    a cover assembly which has a galvanic element, and
    a cell housing, wherein
    the cover assembly is produced by the method according to claim 1.

* * * * *